US008526939B2

(12) United States Patent
Harteneck

(10) Patent No.: US 8,526,939 B2
(45) Date of Patent: Sep. 3, 2013

(54) METHOD AND DEVICE FOR TESTING A MOBILE-RADIO DEVICE BY MEANS OF STATIC CHANNEL SIMULATION

(75) Inventor: Moritz Harteneck, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 134 days.

(21) Appl. No.: 13/127,700

(22) PCT Filed: Sep. 25, 2009

(86) PCT No.: PCT/EP2009/006949
§ 371 (c)(1),
(2), (4) Date: May 25, 2011

(87) PCT Pub. No.: WO2010/051881
PCT Pub. Date: May 14, 2010

(65) Prior Publication Data
US 2011/0223869 A1    Sep. 15, 2011

(30) Foreign Application Priority Data
Nov. 4, 2008    (DE) .......................... 10 2008 055 759

(51) Int. Cl.
*H04W 24/00* (2009.01)
*H04B 17/00* (2006.01)

(52) U.S. Cl.
USPC ..... 455/423; 455/425; 455/67.14; 455/115.2; 455/226.1

(58) Field of Classification Search
USPC ................. 455/423, 425, 67.14, 115.2, 226.1
See application file for complete search history.

(56) References Cited

U.S. PATENT DOCUMENTS

| | | | |
|---|---|---|---|
| 8,149,810 B1* | 4/2012 | Narasimhan et al. | 370/343 |
| 2006/0194553 A1* | 8/2006 | Ozaki et al. | 455/226.1 |
| 2006/0229080 A1* | 10/2006 | Khan et al. | 455/450 |
| 2007/0153731 A1 | 7/2007 | Fine | |
| 2008/0020746 A1* | 1/2008 | Alexandar et al. | 455/423 |
| 2009/0098868 A1* | 4/2009 | Cheng | 455/425 |
| 2009/0122899 A1* | 5/2009 | Kolu et al. | 375/267 |
| 2010/0177836 A1* | 7/2010 | Ylitalo | 375/267 |
| 2011/0151797 A1* | 6/2011 | Michl et al. | 455/67.11 |

OTHER PUBLICATIONS

Celine, G., "Effectively Testing MIMO-Enabled Wireless Devices: Leveraging Controlled RF Environment, Test Automation and Standard Test Data Management Proves to Be Effective for Testing MIMO Devices," RFDesign.com, Aug. 2007, pp. 40, 42, 44.

(Continued)

*Primary Examiner* — Wen Huang
(74) *Attorney, Agent, or Firm* — Christensen O'Connor Johnson Kindness PLLC

(57) ABSTRACT

The invention relates to a device and to a method for testing a mobile radio device in a multiple antenna system using a frequency-selective static channel model for channel simulation in frequency space. In the method according to the invention, the useful data to be transmitted are first allocated to a plurality of carrier frequencies and the associated coding parameters per antenna. The useful data are then modulated onto the carrier frequencies according to the allocation. One or more modulated carrier signals are now distorted in frequency space according to a frequency-selective static channel model. A transmission signal composed of the channel-modeled modulated carrier signals is subsequently transmitted in the period of time to a mobile radio device to be tested.

6 Claims, 2 Drawing Sheets

(56) References Cited

OTHER PUBLICATIONS

Eslami, H., and A.M. Eltawil, "A Scalable Wireless Channel Emulator for Broadband MIMO Systems," IEEE International Conference on Communications (ICC '07), Glasgow, Scotland, Jun. 24-28, 2007, pp. 2592-2597.

Harteneck, M., "LTE: Testing the Physical Layer of Next-Generation Mobile Communications," EDN (Electronics Design, Strategy, News) Europe, Oct. 1, 2008, pp. 1-2.

International Search Report mailed Feb. 23, 2010, issued in corresponding International Application No. PCT/EP2009/006949, filed Sep. 25, 2009, 2 pages.

Picol, S., et al., "Further Steps Toward the Development of a Hardware Simulator for MIMO Radio Channels," IEEE 16th International Symposium on Personal, Indoor and Mobile Radio Communications (PIMRC '05), Berlin, Sep. 11-14, 2005, pp. 557-561.

"R&S®SMU200A Vector Signal Generator," Version 07.00 (Data Sheet), Rhode & Schwarz, Munich, Dec. 2007, 44 pages.

Zhu, W, et al., "An Open Access Wideband Multi-Antenna Wireless Testbed With Remote Control Capability," Proceedings of the First International Conference on Testbeds and Research Infrastructures for the DEvelopment of NeTworks and COMmunities (Tridentcom '05), Trento, Italy, Feb. 21-25, 2005, pp. 72-81.

* cited by examiner

METHOD AND DEVICE FOR TESTING A MOBILE-RADIO DEVICE BY MEANS OF STATIC CHANNEL SIMULATION

The present invention relates to a device and a method for testing mobile-radio devices in a multi-antenna system, which uses time-invariant, but frequency-selective channel simulation.

To meet the increasing demand for transmission speed for data or multi-media service in mobile-radio technology, radio-transmission methods with a high spectral efficiency exploiting the spatial dimension are used for the transmission of information. Accordingly, the OFDM (Orthogonal Frequency Division Multiplexing) modulation method is used, for example, in the mobile-radio standard Long Term Evolution (LTE) of the 3GPP standardisation. In this context, payload information with a fast data rate is subdivided over several partial data streams with slower data rates. These partial data streams are modulated separately with a modulation method such as quadrature amplitude modulation (QAM) with a low bandwidth and applied to a carrier frequency. In the following description, these are referred to as modulated carrier signals. The modulated carrier signals of the individual partial data streams are now added to a transmission signal, wherein the modulated carrier signals are disposed orthogonally relative to one another because of the orthogonality of the carrier function.

A multi-antenna system (MIMO=multiple input multiple output), within which the signal is transmitted, is additionally used for the transmission, for example, from two or four antennas in the base station, for example, to two or four antennas in the mobile-radio device. Accordingly, different payload information or partial data streams can be transmitted with the same frequency but via different antennas. In order to decode the datastream and recombine it, the individual channels must be distinguishable; this is achieved through the allocation of different propagation characteristics to each of the antennas. With different propagation paths between the different base station and radio device antennas, an obliteration of the signal through reflections etc. is additionally minimised. This allows a faster data rate at the same time as an improved transmission quality.

A test device is used in order to test the functions of a mobile-radio device in a multi-antenna system with OFDM modulation under defined, readily reproducible conditions. Accordingly, the external influences on the transmission channels are conventionally simulated by a channel simulator, which influences the signal transmitted from the tester to the mobile-radio device in the time domain, that is to say, on the transmission path.

DE 11 2006 000 207 T5 describes a method and a device for implementing a channel simulation, which is also suitable for a multi-antenna system. In this context, a radio connection between the receiver and at least one noise-signal source is simulated in real time, and the simulation results are stored in a buffer. If the buffer contains results from previous simulated signal sources, the results are combined in a synchronous manner. After this, during the simulation of a radio connection between the transmitter and the receiver, the buffered simulation results are input in real time from the buffer and the input results are added to the simulation.

The channel simulation described above is unsuitable for testing algorithms and/or functional units within a MIMO system which are defined in the frequency domain, for example, the channel estimation in a mobile-radio device. Each individual distortion is made up from a plurality of noise frequencies and varies especially with time. An unambiguous composition of the transmission signal regarding the transmission frequencies at a given time and the reaction of the functional units under test to this transmission-frequency constellation can therefore only be determined at great cost. Moreover, the device described places heavy demands on the capacity and speed of the buffer and software components used.

Accordingly, the object of this invention is to provide an improved method and an improved device for testing a MIMO performance of a mobile-radio device. Furthermore, the channel simulation, should be capable of simple and cost-favourable implementation.

This object is achieved by the method according to the invention specified in claim 1 and the device according to the invention specified in claim 5.

With the method according to the invention, the payload data to be transmitted are first subdivided into partial data streams, which are allocated to a plurality of carrier frequencies and to the associated coding parameters for each antenna. After this, the payload data are modulated onto the carrier frequencies according to the allocation. In the following description, these are referred to as modulated carrier signals. In order to simulate a propagation channel, one or more modulated carrier signals is/are now distorted according to a frequency-selective, static channel model in the frequency domain. A transmission signal, which is made up from the channel-modeled, modulated carrier signals, is then transmitted in the time domain to a mobile-radio device under test.

The device according to the invention therefore comprises an allocation unit for allocating the payload data to be transmitted to the carrier frequencies and the coding parameters to be used for each antenna. Moreover, it comprises a signal generating unit for generating the corresponding, modulated carrier signals for each antenna. A channel simulator unit distorts individual modulated carrier signals in a targeted manner in the frequency domain corresponding to a frequency-specific and time-constant channel model. Through the channel-simulation unit, a targeted distortion of individual carrier frequencies can be achieved. A time variation of the carrier frequencies, such as would occur in the case of a channel simulation in the time domain with time-variable distortion on the transmission path from the tester to the mobile-radio device, is accordingly minimised. Algorithms and/or device components which operate in the frequency domain can advantageously be tested in an uncomplicated and rapid manner. By preference, all of the carrier signals are distorted, wherein, however, the distortion of the individual carrier signals can be different.

Advantageous further developments of the method according to the invention and the device according to the invention are presented in the dependent claims.

In an advantageous manner, an information about the received carrier frequencies and the coding parameters of each individual transmission signal from the mobile-radio device under test is determined, sent back to the tester and compared in the tester with the corresponding, original carrier frequencies and coding parameters of the allocation. This is possible in a particularly simple manner because the channel model operates in a frequency-specific manner and in the frequency domain, and the parameters of the transmission signal are also determined for each carrier frequency.

It is also advantageous to integrate the channel simulator in the tester as an integral component. Accordingly, external influences, such as noise signals from other radio sources are minimised. The tester can be structured in a compact manner, and existing components can also be used for the channel simulation. This allows a compact and also cost-favourable design of the tester.

The invention is explained in greater detail below on the basis of the drawings with reference to an exemplary embodiment. The drawings are as follows.

Parts corresponding to one another are marked with the same reference numbers in all diagrams.

Figure 1:
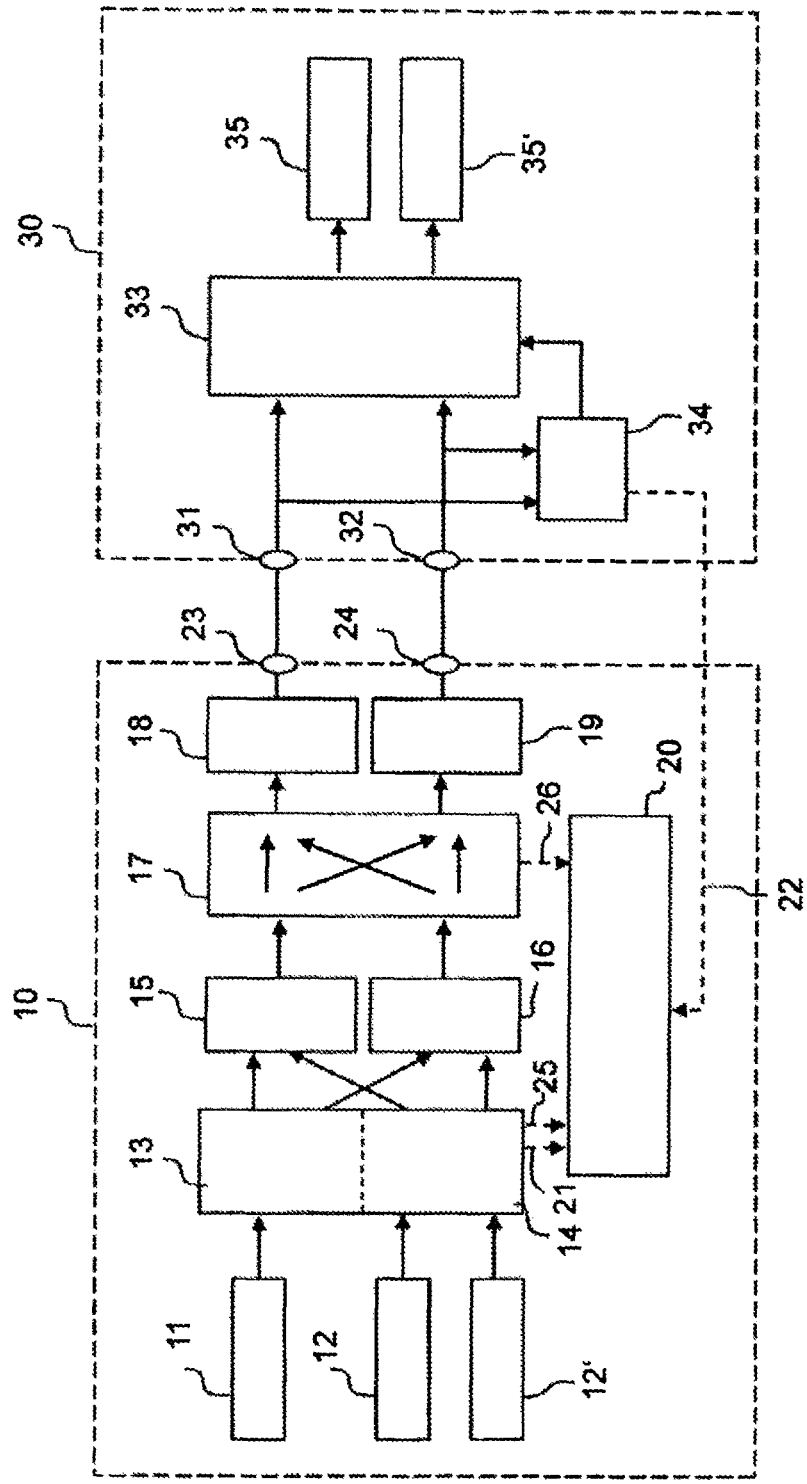
FIG. 1 shows a block circuit diagram of the device according to the invention for testing a mobile-radio device according to the LTE standard with a 2×2 MIMO antenna system.

An exemplary embodiment of the device according to the invention is explained with reference to the block-circuit diagram in FIG. 1. The device shown is used for testing a mobile-radio device which operates, for example, according to the LTE standard. The OFDM (Orthogonal Frequency Division Multiplex) modulation method is used for the radio transmission from the base station, which is simulated here by a tester 10, to the mobile-radio device 30.

The transmission signals are conditioned for the transmission via a multi-antenna system (MIMO) with two outputs 23, 24 in the tester 10 and two inputs 31 and 32 in the mobile-radio device. In the illustrated exemplary embodiment, a tester output 23 and respectively 24 is connected to a mobile-radio-device input 31 and respectively 32, in each case via cable. Instead, the transmission could also be implemented respectively from one antenna for each tester output 23, 24, in each case to one antenna for each mobile-radio input 31, 32. The device is not restricted to a 2×2 MIMO system and can also be used for a transmission system with more or fewer antennas.

The payload data 12, 12' to be transmitted are supplied to the allocation unit 14 and allocated there to the transmission antennas 23, 24 and provided with the corresponding coding parameters. The coding parameters comprise, for example, information on the carrier frequencies to be used and parameters for the propagation characteristic, which are given in a so-called pre-coding matrix. Different pre-coding matrices and frequency ranges are defined corresponding to the transmission quality of the radio channel. The selection of the pre-coding matrix and the carrier-frequency range to be used is controlled via a request from the mobile-radio device 30.

In a similar manner to the payload data, the carrier frequencies to be used and the corresponding coding parameters for each transmission antenna are allocated to the signalling data 11 in an allocation unit 13.

The payload and signalling data are now supplied for each antenna corresponding to the allocation specifications from the unit 13, 14 in each case of a signal-generating unit 15, 16, and modulated there onto a plurality of carrier frequencies in order to generate modulated carrier signals. These modulated carrier signals for each antenna are now transferred to the channel simulator 17. The latter modifies the modulated carrier signals of individual carrier frequencies in a time-constant manner according to a channel model, for example, according to a pattern which can be defined in advance. This corresponds to a static channel with discrete interference of the modulated carrier signals in the frequency domain. The modulated carrier signals resulting from the channel simulation are summated by means of an inverse Fourier transform 18, 19 to form one transmission signal for each antenna and transformed into the time domain. The selection of the carrier frequencies to be distorted is preferably adjustable in the channel model.

Additionally, the transmission signals of the two antennas are combined in such a manner that the resulting signal at the tester output 23 and respectively 24 corresponds to the superimposed reception signal of the two antenna inputs at the mobile-radio-device input 31 and respectively 32. Accordingly, the tester outputs 23 and 24 can be connected via a cable to the mobile-radio-device inputs 31, 32. An interference through the radio-transmission path between the tester and the mobile-radio antenna is therefore precluded. This ensures that precisely the transmission signals generated by the tester 10 arrive in the mobile-radio device 30.

In the mobile-radio device 30, the reception signals of the mobile-radio-device inputs 31 and 32 are supplied to a channel estimator 34 and split up there into the individual modulated carrier signals. For this purpose, a Fourier transform is applied to each of the reception signals of the two antennas. The channel estimator 34 determines information about the received carrier frequencies and their coding parameters and reroutes these to an equaliser 33 for the recovery of the data 35, 35' from the reception signals received at the mobile-radio-device inputs 31 and 32.

Accordingly, the information on carrier frequencies and coding parameters determined by the channel estimator 34 can be transferred in parallel to the evaluation unit 20 in the tester via a connection 22 and compared there with the values 21 used for generating the modulated carrier signals and the channel model 26 from the channel simulator.

Additionally, the channel estimator 34 derives new values for the carrier frequencies and coding parameters to be used in the subsequent transmission signals from the quality of the individual carrier frequencies in the reception signals.

The coding parameters for the antenna characteristic are indicated, for example, via the selection of a given pre-coding matrix from a specified set, the so-called code book. The quality of the individual carrier frequencies or frequency blocks is indicated via a channel-quality indicator (Channel Quality Indicator). These two parameters represent only examples for the parameters determined and can be supplemented with further parameters. These values are reported back to the allocation unit 14 of the tester 10 via a signalling message and used there for the next payload and signalling data 12, 13 to be communicated. It is possible to reroute a copy 25 of these values and information regarding the carrier frequencies 21 from the allocation device and information on the channel model 26 from the channel-simulation unit to the evaluation function for further evaluation measures.

Accordingly, for example, the functioning of the channel estimator can be tested in a simple manner.

Figure 2:
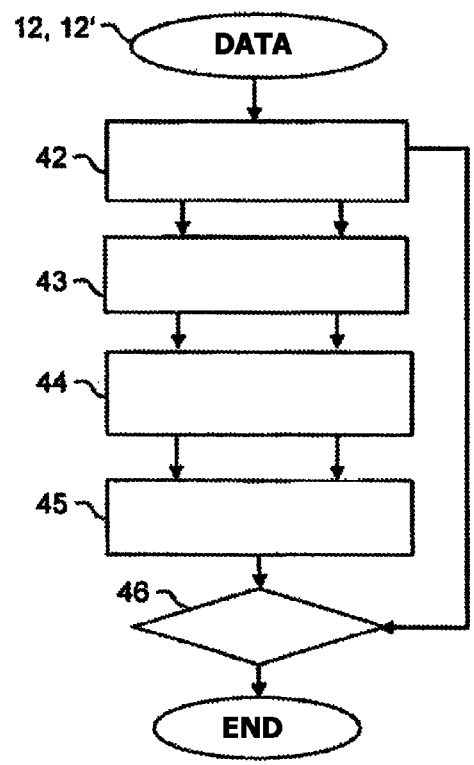
FIG. 2 shows a flow diagram of the method according to the invention.

FIG. 2 shows the individual steps of the method according to the invention in a flow diagram. The data 12, 12' to be communicated represent the starting point.

These are allocated in step 42 to the carrier frequencies and to the coding parameters via the two base-station antennas 23, 24. In step 43, the modulated carrier signals are generated for each antenna according to the allocated carrier frequencies and coding parameters. Accordingly, the modulated carrier signals which are allocated to an antenna, are each marked by an arrow. The modulated carrier signals or at least a some of the latter are now varied in step 44 via a time-invariant, frequency-selective channel model in the frequency domain and transferred via an inverse Fourier transform into a time-variable transmission signal in the time domain and transmitted to the mobile-radio device 30. Optionally, the disturbed transmission signals of the two antennas are combined in such a manner that the resulting signal corresponds to the superimposed reception signal of the two antenna inputs.

Through the channel estimation in the mobile-radio device 30, the transmission frequencies, quality and propagation characteristic of the individual, modulated carrier signals of the two antenna signals are determined. The values from the channel estimation are now compared in step 46 with the values which were used in the allocation to the payload data to be transmitted in step 42.

Figure 3:
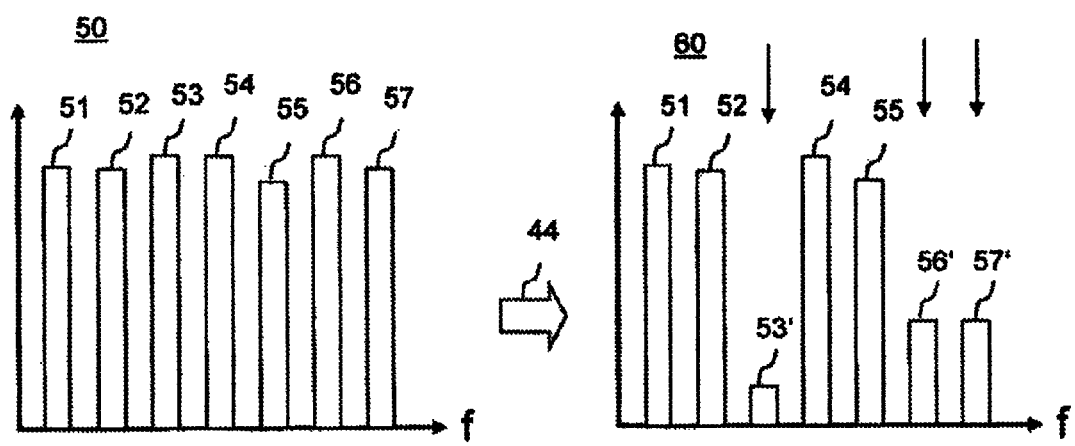
FIG. 3 shows an exemplary transmission signal of an antenna before and after the channel simulation.

FIG. 3 shows schematically the variation of the modulated carrier signals of one antenna via the frequency-selective but time-static channel simulation in the frequency domain. Diagram 50 shows the individual modulated carrier signals with the carrier frequencies 51, 52, . . . , 57 after the method step 43, the generation of the modulated carrier signals corresponding to the carrier frequency and coding parameter allocations and respectively before the channel simulation 44. Diagram 60 shows the carrier signals after the channel simulation 44, indicated here by the arrow. The modulated carrier signals with the carrier frequencies 53', 56' and 57 have been varied. The variations here can relate to the carrier signal power, propagation characteristic or also phase position.

All of the features described and/or illustrated can be advantageously combined with one another within the framework of the invention. The invention is not restricted to the exemplary embodiments.

The invention claimed is:

1. A method for testing a mobile-radio device with a tester, wherein payload data are transmitted between tester and mobile-radio device via a multi-antenna system, in which a transmitted signal, composed of a plurality of modulated carrier signals with different carrier frequencies, is transmitted, with the following method steps:

allocating the data to be transmitted to a plurality of carrier frequencies and coding parameters for each transmission antenna;

generating a plurality of modulated carrier signals corresponding to the allocated carrier frequencies and coding parameters;

distorting one or more modulated carrier signals of a plurality of modulated carrier signals by means of a frequency-selective, static channel model in the frequency domain;

transmitting a transmission signal, which is composed of the channel-modeled, modulated carrier signals, to a mobile-radio device in the time domain;

determining information regarding carrier frequencies and coding parameters of the received signal in the mobile-radio device and transmission of the determined information to the tester, wherein in the tester, the information regarding the carrier frequencies received in the mobile-radio device and the coding parameters of the individual modulated carrier signals, which the mobile-radio device determines, is evaluated with the original allocation information, which was allocated to the data to be transmitted during the allocation for each transmission antenna in the tester, and the information regarding the static channel model used; and wherein the allocation of the data to be transmitted to a plurality of carrier frequencies and coding parameters for each transmission antenna for the next data to be communicated is implemented on the basis of the information evaluated in the tester regarding the carrier frequencies and coding parameters received and determined in the mobile-radio device and reported back to the tester.

2. The method for testing a mobile-radio device according to claim 1, wherein a reception signal to be anticipated is calculated by the tester from the transmission signals of all transmission antennas for every mobile-radio device input.

3. The method for testing a mobile-radio device according to claim 1, wherein a distortion of one or more modulated carrier signals corresponding to a channel model is implemented in the tester, and a determination of the information regarding the received carrier frequencies and the coding parameters of the individual modulated carrier signals is implemented in the mobile-radio device.

4. A device for testing a mobile-radio device in a multi-antenna system, comprising:

an allocation unit, which allocates the data to be transmitted to a plurality of carrier frequencies and coding parameters;

a signal-generating unit, which generates a plurality of carrier signals corresponding to the allocated transmission frequencies and coding parameters for each antenna;

a channel-simulator unit, which distorts one or more modulated carrier signals from the plurality of carrier signals corresponding to a frequency-specific, static channel model in the frequency domain;

an output unit, which transmits a transmission signal, which is composed of the channel-modulated carrier signals, in the time domain to a mobile-radio device, wherein information regarding the received carrier frequencies and the coding parameters of the individual modulated carrier signals which the mobile-radio device determines, is evaluated with the original allocation information, which was allocated to the data to be transmitted during the allocation and the information regarding the static channel model used; and wherein the allocation of the data to be transmitted to a plurality of carrier frequencies and coding parameters for each transmission antenna for the next data to be communicated is implemented on the basis of the information evaluated in the tester regarding via the carrier frequencies and coding parameters received and determined in the mobile-radio device and reported back to the tester.

5. The device for testing a mobile-radio device according to claim 4, wherein an evaluation unit is provided, which is set up in such a manner that it receives from the mobile-radio device the information regarding the received carrier frequencies and the coding parameters of the individual modulated carrier signals, which the mobile-radio device determines, and evaluates this with the allocation information, which was allocated to the data to be transmitted during the allocation, and information regarding the static channel model used.

6. The device for testing a mobile-radio device according to claim 4, wherein the channel simulator is integrated in the device for testing a mobile-radio device as an integral component and operates in the frequency domain.

* * * * *